Dec. 12, 1944.                A. RIDD                2,365,109
                       TIRE VULCANIZING CLAMP
                         Filed June 1, 1943
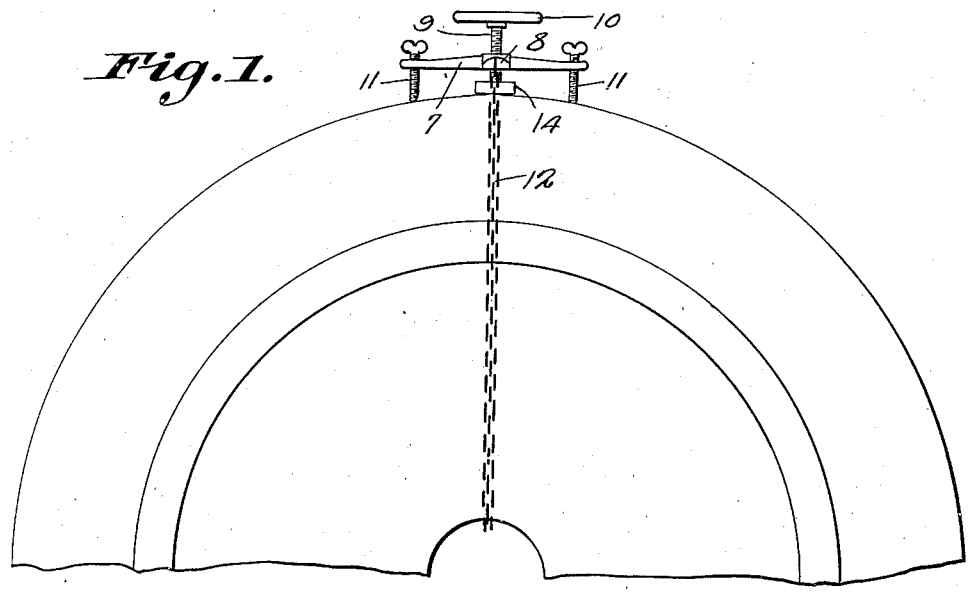
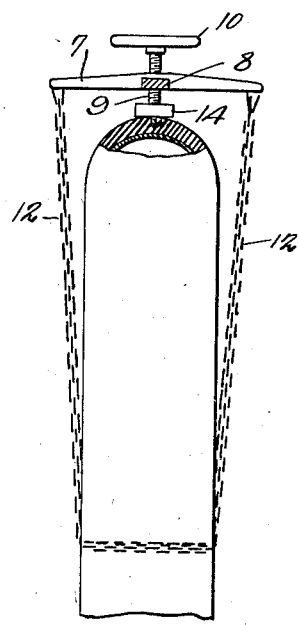
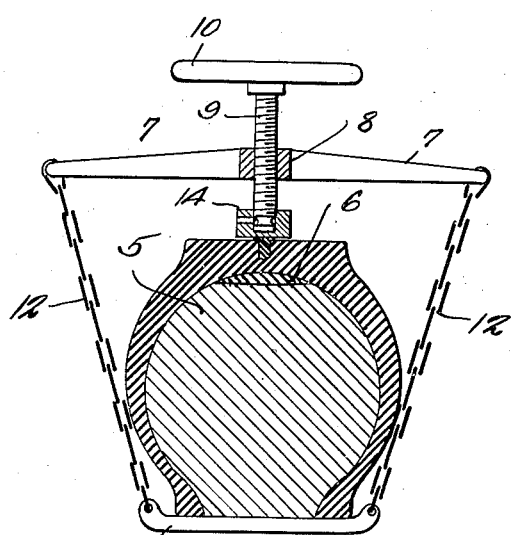
Ambrose Ridd
INVENTOR.
BY
Attorney Patented Dec. 12, 1944

2,365,109

UNITED STATES PATENT OFFICE 2,365,109

TIRE-VULCANIZING CLAMP

Ambrose Ridd, Louisville, Ky.

Application June 1, 1943, Serial No. 489,280

5 Claims. (Cl. 18—18)

This invention relates to pneumatic tire casing repair apparatus, the primary object of the invention being to provide means for directing pressure on the tire casing at the point of damage, during the fusing period of the patches used in repairing the tire casing, thereby insuring the proper curing of the repair patches, to provide a lasting repair job.

An important object of the invention is to provide a device of this character including a solid core which is positioned within the tire casing under repair, so that excessive pressure may be applied directly to the casing, at the point of repair.

Still another object of the invention is to provide a holder of this character which may be readily and easily applied and used to repair a casing, by persons unfamiliar with mechanics.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a side elevational view of a clamping device constructed in accordance with the invention.

Figure 2 is a view in elevation, partially in section of the device as applied to a tire, the view being taken at right angles to the showing of Fig. 1.

Figure 3 is a transverse sectional view through the clamp and core.

Referring to the drawing in detail, the device comprises a solid core 5 which is of a construction to fit within the tire casing, the core contacting with the inner wall of the casing to hold the casing extended, as is the casing when inflated.

As shown, the core is formed with a substantially flat portion adjacent to the tread section of the casing, so that when the core has been positioned, a cavity is provided for the reception of the pad 6 or cushioning member, which is constructed preferably of rubber. The clamp also includes arms 7 that radiate from the hub 8 formed with a threaded opening, for the reception of the threaded shank 9 which carries a hand-wheel 10 at its upper end, whereby the shank 9 may be rotated to move the arms longitudinally of the threaded shank.

The arms 8 are provided with threaded openings adjacent to the free ends thereof, in which the winged screws 11 are held, the screws being provided to engage the tread of the tire and hold the arms against tilting, when pressure is applied through the threaded shank 9, to the repair patches held by the device.

The arms 7 are of lengths to extend beyond the side edges of the tire casing being repaired, as shown by Fig. 3 of the drawing, where they are formed with openings to receive the end links of the chains 12, the chains 12 being also connected with the bar 13. This bar 13 is adapted to bear against the inner surface of the core 5 adjacent to the bead of the casing within which the core is positioned, thereby protecting the bead of the tire against damage when pressure is brought to bear on the bar 13.

A pressure head indicated at 14 is swiveled on the lower end of the threaded shank 9, and is adapted to cooperate with the core 5, in directing pressure to the fusible patches which are applied to the damaged portion of the casing in repairing the casing.

In the event that the damaged portion of the casing is at the side wall, the bar 13 is eliminated, and a continuous chain is provided between the ends of the arms 7, the chain being held in contact with the casing, and the pressure head 14 brought to bear on the casing directly over the damaged portion thereof.

With the clamp forming the subject matter of the present invention, it is possible to use fusible patches both interiorly and exteriorly of the casing simultaneously, the clamp acting to hold the fusible patches in their proper positions for effectively repairing the damaged casing.

It will further be seen that due to applicant's structure, damaged side walls and treads of casings of motor vehicle tires, may be readily repaired by the use of fuse patches, while the tire is inflated and mounted, the air pressure within the tire acting to hold the tire casing firmly against the patch while the clamp, forming the subject matter of the invention, exerts pressure on the outer surface of the patch during vulcanizing.

What is claimed is:

1. A tire casing repair clamp, comprising a solid core adapted to be fitted within a tire, a flattened portion formed on the surface thereof, defining a compartment with the casing to accommodate a cushioning member, a hub having a threaded opening, a threaded shank, operating in the threaded openings, arms radiating from the hub, a head swiveled on one end of the shank and adapted to bear against the tire casing under treatment, directly over the core, and to clamp repair patches to the casing, winged screws extending through the ends of certain of said arms and adapted to bear against the casing, holding said arms in position, a cross-bar adapted to be positioned under the core, and chains connected with said cross-bar and ends of certain others of the arms, whereby said head is movable into clamping relation with the core.

2. A tire casing clamp, comprising a solid core adapted to be fitted within a tire in contact with the inner surface of the tire, a flattened portion formed on the surface of the core and defining a compartment with the casing in which the core is positioned, for the reception of a pad, a hub formed with a threaded opening, arms radiating from the hub, the ends of certain of the arms extending beyond the sides of the tire casing with which the clamp is used, a threaded shank operating through the threaded opening of the hub of the arms and adapted to exert a pressure on the core, a head swiveled on one end of the threaded shank and adapted to contact with the tire casing under treatment, certain others of said arms being disposed substantially intermediate the side edges of said casing under treatment, and having means for directing pressure against the said core, a cross-bar adapted to be fitted under the core, and chains connecting the ends of the cross-bar to the ends of the arms extending beyond the sides of the casing, holding said arms to the casing.

3. A tire casing clamp, comprising a solid core adapted to be fitted within a tire casing, a hub having a threaded opening, forming a part of the clamp, arms extending from the hub, certain of said arms extending transversely of the tire casing under treatment, certain others of said arms extending in the plane of the tire casing at a point intermediate the side edges thereof, means on the last mentioned arms for holding the arms in upright positions on the casing under treatment, a cross-bar adapted to be fitted under the core, chains connecting the cross-bar to the transversely disposed arms, and a threaded shank operating through the threaded opening of the hub and adapted to direct pressure against the tire casing under treatment, when the shank is rotated in one direction.

4. A tire casing clamp, comprising a solid core adapted to be fitted within a tire in contact with the inner surface of the tire, a hub having a threaded opening arms radiating from the hub and adapted to be positioned over the tire casing, means carried by certain of the arms for engaging the tire casing holding the arms in upright positions, a cross-bar adapted to be fitted under the core in engagement therewith, chains connecting the ends of the cross-bar to the ends of certain others of said arms, and an adjustable member operating through the hub and adapted to move the arms away from the tire under treatment, directing pressure against said core from the inner edge of the core.

5. A clamp adapted for use in clamping fuse patches to inflated vehicle tires, comprising a hub, arms radiating from the hub, said hub having a central threaded opening, a pressure screw operating through the opening and adapted to bear against a fuse patch positioned on the tire, screws extending through one of said arms and adapted to engage the tire casing, holding the clamp against twisting, chains extending downwardly from the ends of the adjacent arm, and a bar adapted to fit under the tire and to which said chains are connected whereby said clamp is held to the tire, when pressure is applied by said pressure screw.

AMBROSE RIDD.